US009878319B2

(12) United States Patent
Alaei et al.

(10) Patent No.: US 9,878,319 B2
(45) Date of Patent: Jan. 30, 2018

(54) NANOCATALYST FOR HEAVY CRUDE OIL UPGRADING AND METHOD FOR SYNTHESIZING SAME

(71) Applicant: Research Institute of Petroleum Industry (RIPI), Tehran (IR)

(72) Inventors: Mahshad Alaei, Tehran (IR); Alimorad Rashidi, Tehran (IR); Alireza Mahjoub, Tehran (IR); Mohsen Ghanami, Tehran (IR); Amir Hossein Bornaee, Tehran (IR)

(73) Assignee: RESEARCH INSTITUTE OF PETROLEUM INDUSTRY (RIPI), Tehran (IR)

( * ) Notice: Subject to any disclaimer, the term of this patent is extended or adjusted under 35 U.S.C. 154(b) by 364 days.

(21) Appl. No.: 14/537,349

(22) Filed: Nov. 10, 2014

(65) Prior Publication Data

US 2015/0129463 A1    May 14, 2015

Related U.S. Application Data

(60) Provisional application No. 61/902,159, filed on Nov. 9, 2013.

(51) Int. Cl.
*B01J 31/34*     (2006.01)
*C10G 47/06*     (2006.01)

(52) U.S. Cl.
CPC ............. *B01J 31/34* (2013.01); *C10G 47/06* (2013.01); *B01J 2231/005* (2013.01)

(58) Field of Classification Search
CPC ........ B01J 27/04; B01J 27/047; B01J 27/051; C10G 47/06

USPC ......... 502/219–220; 977/700, 712, 734, 773, 977/775, 783, 786
See application file for complete search history.

(56) References Cited

U.S. PATENT DOCUMENTS

| | | | | |
|---|---|---|---|---|
| 2,649,419 A | * | 8/1953 | Johnson | B01J 27/0515 502/220 |
| 2,780,617 A | * | 2/1957 | Zletz | C08F 10/00 260/DIG. 25 |
| 4,822,590 A | * | 4/1989 | Morrison | C01B 17/20 106/DIG. 2 |

(Continued)

FOREIGN PATENT DOCUMENTS

| | | | | |
|---|---|---|---|---|
| CA | 884308 | * | 10/1971 | |
| CN | 10-2874767 | * | 1/2013 | ............. B82Y 30/30 |

(Continued)

OTHER PUBLICATIONS

"Exfoliated MoS2 nanosheets as efficient catalysts for electrochemical hydrogen evolution," Shanshan Ji et al. Electrochimica Acta 109 (2013), pp. 269-275.*

(Continued)

*Primary Examiner* — Patricia L. Hailey
(74) *Attorney, Agent, or Firm* — NovoTechIP International PLLC

(57) ABSTRACT

A dispersing-type nanocatalyst for catalytic hydrocracking of heavy oil, a method for preparing the same, and the use thereof in catalytic hydrocracking of heavy oil. The present invention is also directed to reducing the operational temperature of catalytic hydrocracking of heavy crude oil, and also increasing the yield of the process by utilizing a lower concentration of said nanocatalyst.

17 Claims, 5 Drawing Sheets

(56) References Cited

U.S. PATENT DOCUMENTS

| | | | | |
|---|---|---|---|---|
| 4,853,359 | A | * | 8/1989 | Morrison ................ B01J 27/04 208/143 |
| 4,867,840 | A | * | 9/1989 | Roxlo ..................... B01J 27/02 216/66 |
| 4,996,108 | A | * | 2/1991 | Divigalpitiya ........ C01B 19/007 423/53 |
| 5,980,749 | A | * | 11/1999 | Rendina ................ C02F 1/5236 210/633 |
| 2005/0065044 | A1 | * | 3/2005 | Migdal ................ C10M 171/06 508/230 |
| 2009/0314684 | A1 | * | 12/2009 | Kuperman ............ C10G 1/083 208/121 |
| 2010/0222482 | A1 | * | 9/2010 | Jang ...................... B82Y 30/00 524/424 |
| 2012/0021293 | A1 | * | 1/2012 | Zhamu ................ C01B 31/0423 429/231.5 |
| 2013/0281335 | A1 | * | 10/2013 | Altavilla ................ B82Y 30/00 508/367 |
| 2014/0147398 | A1 | * | 5/2014 | Hamilton ................ A61K 8/29 424/59 |
| 2017/0087539 | A1 | * | 3/2017 | Beltramini ........... B01J 27/0515 |

FOREIGN PATENT DOCUMENTS

| | | | | |
|---|---|---|---|---|
| WO | 2012/031330 | * | 3/2012 | ............ B01J 23/755 |
| WO | 2016/065890 | * | 5/2016 | ............ B01J 27/051 |

OTHER PUBLICATIONS

"Exfoliated and Restacked MoS2 and WS2: Ionic or Neutral Species? Encapsulation and Ordering of Hard Electropositive Cations," Joy Helsing et al. J. Am. Chem. Soc., 1999, 121, pp. 11720-11732.*

* cited by examiner

NANOCATALYST FOR HEAVY CRUDE OIL UPGRADING AND METHOD FOR SYNTHESIZING SAME

CROSS REFERENCE TO RELATED APPLICATION

The present invention claims priority from U.S. Provisional Patent Application Ser. No. 61/902,159, filed Nov. 9, 2013, entitled "Heavy Crude Oil Upgrading Nanocatalyst," the subject matter of which is incorporated by reference herein in its entirety.

SPONSORSHIP STATEMENT

This application has been sponsored by the Iranian Nanotechnology Initiative Council, which does not have any rights in this application.

TECHNICAL FIELD

The present invention relates to a dispersing-type nanocatalyst for catalytic hydrocracking of oil, such as heavy oil, a method for preparing the same, and the use thereof in catalytic hydrocracking of heavy oil.

BACKGROUND OF THE INVENTION

Heavy oil upgrading has attracted worldwide attention because of decreasing conventional sweet crude oil reserves. Heavy crude oil, however, can be converted into usable light oil, and is available in a significant number of unspent reservoirs.

As is understood in the art, coking and hydrocracking are two primary upgrading approaches in the petroleum industry to convert heavy crude oil into light crude oil. It is also known that coking produces large amounts of unmarketable coke, and hydrocracking, often operated in the presence of a catalyst, suffers from operational problems related to catalyst deactivation.

As is known from the prior art, one approach to limiting the effect of catalyst deactivation is to perform the reaction in slurry hydrocracking reactors using unsupported catalysts dispersed in the heavy oil. The degree of the catalyst dispersion is quite important in a slurry process, as it strongly affects the catalyst activity. A well-dispersed catalyst favors the rapid uptake of hydrogen, which prevents free radical condensation among heavy oil molecules that would lead to coke formation.

It is generally agreed that molybdenum-based catalysts provide the best performance in the aforesaid hydrocracking process. Dispersed $MoS_2$ catalysts are usually based on oil-soluble organometallics, such as molybdenum naphthenate, molybdenum dithiocarboxylate and molybdenum dithiophosphate, which are used as precursors. The active form of the so-called catalyst is generated in situ by thermally decomposing the precursor and reacting with sulfur. The sources of sulfur include sulfur originally present in the feedstock, or externally added, suitable sulfur-containing compounds, such as $H_2S$ and elemental sulfur. The produced $MoS_2$ through the aforementioned procedure could be in the form of micrometer-sized or nanometer-sized particles. However, in situ production of $MoS_2$ is not complete in that most of the prepared catalyst particles are microparticles.

It should be understood that commercializing the slurry bed reactor for heavy crude oil upgrading is too difficult, which is partly due to the high cost of the $MoS_2$ catalyst, despite the use of low catalyst concentrations. To tackle this problem, one approach is to further reducing the required amount of catalyst concentration (<200 ppm) for the process, while maintaining the overall hydrocracking performance as the same. In addition, the recycling of the $MoS_2$ catalyst is an important issue in catalyst development for an economic slurry hydrocracking process.

There is, therefore, a present need for an improved catalytic, heavy-crude-oil hydrocracking process, as well as a significant reduction of the requisite catalyst concentration required in such processes.

It is, therefore, an object of the present invention to provide a new and improved nanocatalyst for such heavy crude oil upgrading processes. The new catalyst makes it possible to carry out the hydrocracking process with a much lower amount of catalyst than required in prior art processes, and consequently minimizing or eliminating the requirement in the prior art for catalyst recovery.

It is also an object of this invention to lower the operating temperature of the heavy crude oil hydrocracking process.

Furthermore, it is an object of the present invention to increase the efficiency of the hydrocracking process, despite the lower requisite catalyst concentrations.

These objects are met in various embodiments of the present invention where heavy crude oil upgrading nanocatalysts and methods to synthesize the same are described. As a result of this advancement in the technology, hydrocracking processes can be operated with lower amounts of catalyst, thereby saving costs and making the process viable over the prior art techniques for catalyst recovery. Accordingly, the improved, nanocatalysts and the methods for their production, as set forth in the present invention, offer significant advantages over the known prior art.

SUMMARY OF THE INVENTION

The present invention relates to a heavy crude oil upgrading nanocatalyst and a method to synthesize the same. The nanocatalyst preferably includes exfoliated transition metal sulfide nanoparticles dispersed in a nonpolar solvent. The method for synthesizing the nanocatalyst pursuant to the present invention preferably has three main steps: at first, synthesizing one or several nanometal sulfides using metals preferably from the sixth group of transition elements in the periodic table; secondly, exfoliating metal sulfide nanoparticles in a polar solvent; and, finally, exchanging the polar solvent with a nonpolar solvent.

In one embodiment of the present invention, the aforesaid transition metal is molybdenum, tungsten, chromium or mixtures thereof. In another embodiment of the present invention the nonpolar solvent is decalin.

In another aspect, the present invention is related to the heavy crude oil hydrocracking process, and more particularly to a heavy crude oil hydrocracking process using exfoliated transition metal nanocatalysts, as disclosed herein. The aforesaid process preferably has three steps: first, receiving the heavy crude oil feedstock; second, mixing the heavy crude oil feedstock with the aforesaid exfoliated transition metal nanocatalyst in a hydrocracking zone under a hydrogen atmosphere; and, finally, heating the mixture of heavy crude oil feedstock and the heavy crude oil upgrading nanocatalyst to a particular temperature for the hydrocracking reaction to occur.

It should be understood that in some implementations of the present invention described hereinbelow the aforementioned exfoliated transition metal nanocatalyst is mixed with the feedstock with a concentration of preferably between about 150 ppm to about 300 ppm, and more preferably from about 150 ppm to about 250 ppm.

In other embodiments of the present invention, the hydrocracking reaction preferably occurs under a hydrogen atmosphere at a temperature range of from about 330° C. to about 370° C. and at a pressure range of about 30 bars to about 110 bars.

Details of one or more implementations and/or embodiments of the present invention are set forth in the accompanying DRAWINGS and the description below. Other aspects that can be implemented will be apparent from the description and the DRAWINGS, and from the claims.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying DRAWINGS, where like reference numerals designate like structural and other elements, in which:

DETAILED DESCRIPTION OF THE INVENTION

Figure 1:
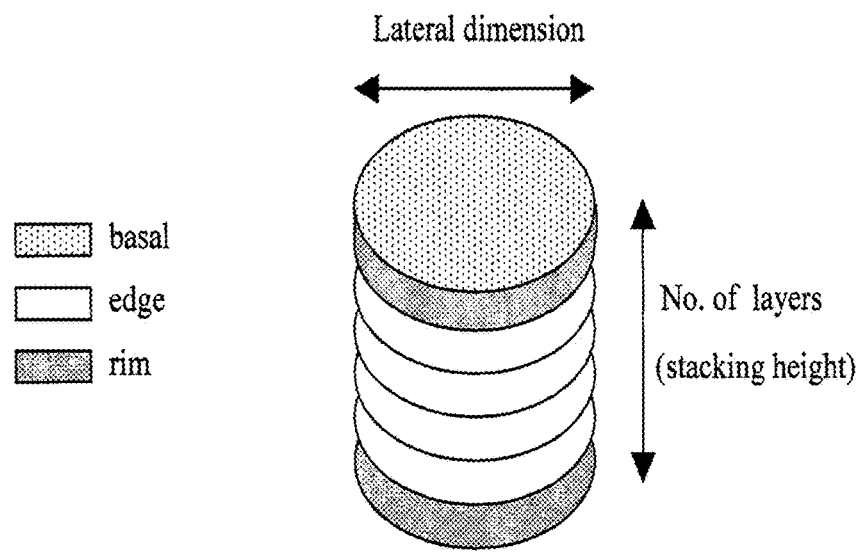
FIG. 1 illustrates the rim-edge model of a $MoS_2$ catalytic particle.

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

It should be understood by a person skilled in the art that the innovation described herein is directed to various improvements in the synthesis of a nanocatalyst for heavy crude oil upgrading, a method for preparing the same and the use thereof in catalytic hydrocracking of heavy oil. It should, of course, be understood that aspects of the instant invention may also prove useful in related contexts, as is understood to those of skill in the pertinent arts.

The heavy crude oil upgrading nanocatalyst presented in this invention includes one or perhaps several exfoliated nanometal sulfides, such as from the sixth group of transition elements in the periodic table. This nanocatalyst has a layered structure consisting of planes with nanometric distances, as described further hereinbelow.

A preferred synthesis method for the nanocatalyst is also disclosed in the present application, which includes preferably three main steps: first, synthesizing one or perhaps several nanometal sulfides using metals from sixth group of transition elements in the periodic table; second, exfoliating metal sulfide nanoparticles in a polar solvent; and, finally, exchanging the polar solvent with a nonpolar solvent as discussed in more detail hereinbelow.

Regarding the first step or stage, transition metal sulfide nanoparticles can be synthesized by either sulphidation of transition metal oxide nanoparticles or by conventional, more direct methods, such as a hydrothermal method. Transition metal oxide nanoparticles can be synthesized via conventional methods known to a person skilled in the art, such as by sol-gel or spray pyrolysis, and like techniques.

As is understood in the art, the hydrothermal method is carried out in a pressurized autoclave. In a preferred embodiment of the present invention, the precursor in the hydrothermal method is a water soluble transition metal salt, such as ammonium hepta molybdate, and the sulfur source is an alkaline metal sulfide, such as sodium sulfide.

Hydrothermal cells are filled with water solution of said alkaline metal sulphide or sulfide and water soluble transition metal salt up to, for example, 75 percent by volume of the cell. The transition metal sulfide nanoparticles are then produced as the final product. In one embodiment of the present invention, materials, such as urea, are used to create a porous structure in the final product. Urea releases carbon dioxide or carbon monoxide, which leads to the formation of the aforementioned porous structures in the synthesized transition metal sulfide nanoparticles.

As mentioned hereinabove, transition metal sulfide nanoparticles are also synthesized through an indirect method, in which transition metal oxide nanoparticles are sulphadized in the presence of $H_2$/He as reducing gas, and $H_2S$ as sulphidizing gas in a horizontal tubular furnace.

Transition metal sulfide nanoparticles produced via any of the two methods described hereinabove are exfoliated in the next stage of the nanocatalyst synthesis process of the present invention.

It should be understood by a person skilled in the art that the transition metal sulfide nanoparticle (hereinafter termed "nanometal sulfide") structure has a significant effect on the activity of the nanocatalyst. As is known from the prior art, nanometal sulfides have layered structures with weak van der Waals interlayer bondings. It is also known that active sites in nanometal sulfide are metallic sites with sulfur vacancies, and these sites are closely associated with the edges of the layers of the crystal.

With reference now to FIG. 1 of the DRAWINGS, this figure illustrates a rim-edge model describing the aforementioned layered structure of an exemplar transition metal sulfide nanoparticle, namely $MoS_2$. As can be seen in this figure, the top and bottom layers of the $MoS_2$ slab are called the rim sites. The planes in between, designated by the color white, are called the edge planes.

According to this rim-edge model, hydrogenation reactions are catalyzed predominantly by the aforedescribed rim sites. Both hydrogenation and hydrogenolysis are catalyzed on all the edge planes. The basal plane of the nanometal sulfide, also illustrated in FIG. 1, is considered to be inert catalytically.

Regarding the second step or stage, the nanometal sulfide exfoliating stage, this is where a unique structure for the aforesaid nanoparticles catalyst is created. In this unique structure, each of the exfoliated nanometal sulfide layers can act as a rim site. In other words, exfoliation separates the nanometal sulfide layers, and thereby increases the number of active rim sites. Accordingly, the overall activity of nanocatalyst increases significantly.

The importance of the nanometric size of the transition metal sulfide particles and its effect on the exfoliation step results should be understood. Using transition metal sulfide nanoparticles, instead of transition metal microparticles, results in reactive rim sites with a more regular formation with the aforementioned rim sites having nanometric thicknesses and nanometric interlayer distances, which, in turn, leads to an increase in the catalyst reactivity.

The nanometal sulfide, synthesized as described hereinabove, is preferably exfoliated via a conventional method known from the prior art. In this method, nanometal sulfide is intercalated with lithium by mixing the nanometal sulfide with n-butyllithium in hexane under nitrogen atmosphere. The mixture is then left to age. The supernatant is subsequently decanted and the remaining Li-intercalated nanometal sulfide is exfoliated by adding water and sonicating the resultant mixture. The exfoliated nanometal sulfide is then collected by centrifugation, and washed with water for neutralization. The resultant mixture contains nanometal sulfide particles dispersed in water, and is called or termed hereinafter as "exfoliated nanometal sulfide."

In a preferred embodiment of the present invention, nanometal sulfide is intercalated with lithium by mixing the nanometal sulfide with a 1.6 molar solution of n-butyllithium in hexane under nitrogen atmosphere. The mixture is then left to age for at least 72 hours.

Finally, in the third step or stage, the exfoliated nanometal sulfide is washed with an alcoholic solvent for a phase exchange. The resultant mixture is then washed with a nonpolar solvent. The resultant nanocatalyst contains exfoliated nanometal sulfide particles dispersed in the aforementioned nonpolar solvent.

In one embodiment of the present invention, the alcoholic solvent is preferably ethanol or 2-propanol. In another embodiment, the nonpolar solvent is preferably decalin.

In some embodiments of the present invention, the minimum amount of the exfoliated nanometal sulfide particles dispersed in the nonpolar solvent is preferably about 0.5% to about 2% by weight.

It should be understood by a person skilled in the art that the exfoliated nanocatalyst disclosed in the present invention can be used for any kind of heavy crude oil hydrocracking, and it can be used in any slurry hydrocracking process.

As is known from the prior art, hydrocracking processes are usually carried out at temperatures higher than 400° C. and pressures between about 30 to 110 bars. The reaction time is generally between about 0.5 to about 2 hours. Using the nanocatalyst particles made by the instant invention as disclosed hereinabove, however, with a preferred concentration range from about 150 ppm and about 300 ppm, and more preferably form about 150 ppm and about 250 ppm, the hydrocracking process can be carried out in a lower temperature range, preferably from about 330° C. to about 370° C., and preferably at about 350° C. As is well understood to those of skill in the art, the aforementioned reduction in the reaction temperature for the hydrocracking process is a significant industrial production advantage, achieved by the use of said nanometal sulfide particles prepared by the method described in the present invention.

In an effort to illustrate the methods for the production of the catalyst pursuant to the present invention and their performance, some examples are set forth hereinbelow. It should be understood that these examples are exemplary and illustrative only. The examples should not be deemed as limiting the scope of the present invention. The only limitations of the scope of the instant case are set forth in the claims appended hereinbelow.

Example 1

In this example $MoS_2$ nanoparticles (hereinafter "nano-$MoS_2$ particles") are synthesized via the aforementioned indirect method. $MoO_3$ nanoparticles are used as the precursor in the gas-phase reaction in the presence of $H_2$/He as reducing gas and $H_2S$ as sulphidizing gas at 850° C. for 1 hour in a horizontal tubular furnace.

Figure 2:
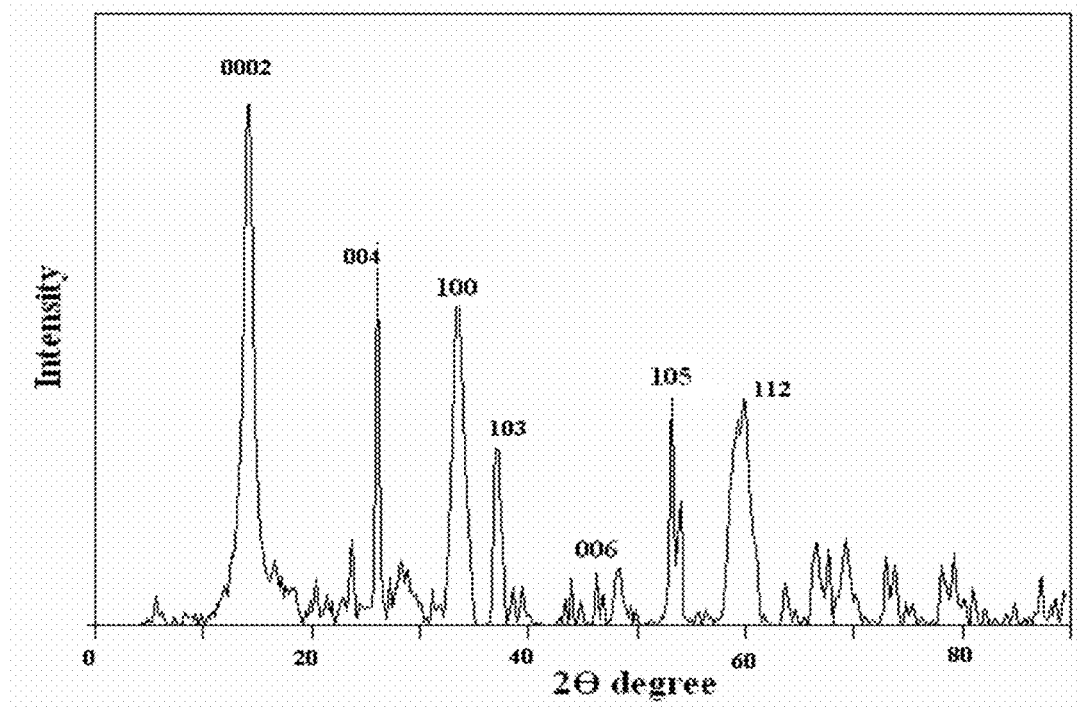
FIG. 2 illustrates X-ray diffraction (XRD) patterns of $MoS_2$ nanoparticles prepared by the indirect method, pursuant to the teachings of the present invention.

With reference now to FIG. 2 of the DRAWINGS, this figure illustrates the X-Ray Diffraction (XRD) patterns of the nanoparticles synthesized via the indirect method, as described hereinabove. As is known to a person skilled in the art, comparing all the diffractions shown in this figure with the standard Joint Committee on Powder Diffraction Standards (JCPDS) card No. 37-149, confirms the presence of $MoS_2$ hexagonal crystalline network in the prepared sample. The average particle size of the sample can be calculated from the 0002 diffraction plane, designated in FIG. 2 of the DRAWINGS, with a Debye-Scherrer formula, as is known to those of skill in the art. The average size of $MoS_2$ particles, produced via the indirect method described hereinabove, is about 50 nm.

Figure 3:
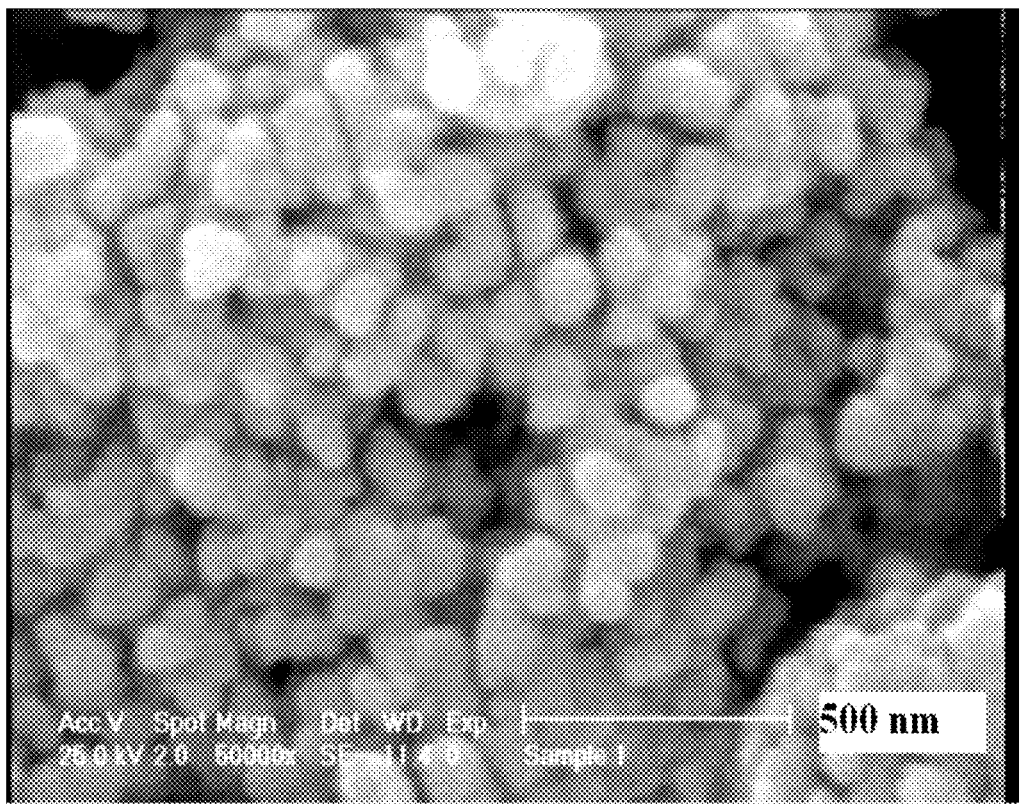
FIG. 3 is a scanning electron microscope (SEM) image of $MoS_2$ nanoparticles prepared by the indirect method with image resolution of 500 nm.

With reference now to FIG. 3 of the DRAWINGS, there is illustrated a scanning electron microscope (SEM) image of nano-$MoS_2$ particles prepared by the indirect method described hereinabove, with an image resolution of 500 nm. This image confirms the nanometric size of $MoS_2$ particles and their semi-spherical morphology and homogeneous distribution.

Example 2

In this example, nano-$MoS_2$ particles are synthesized via the aforementioned hydrothermal method. Here, 2 grams of ammonium hepta molibdate and 2 grams of urea are dissolved in 150 milliliters of distilled water. Then, the solution is transferred to the hydrothermal cell and the hydrothermal reaction is carried out at 180° C. for 24 hours. The product is washed with water and ethanol; finally, it is dried in the oven.

Figure 4:
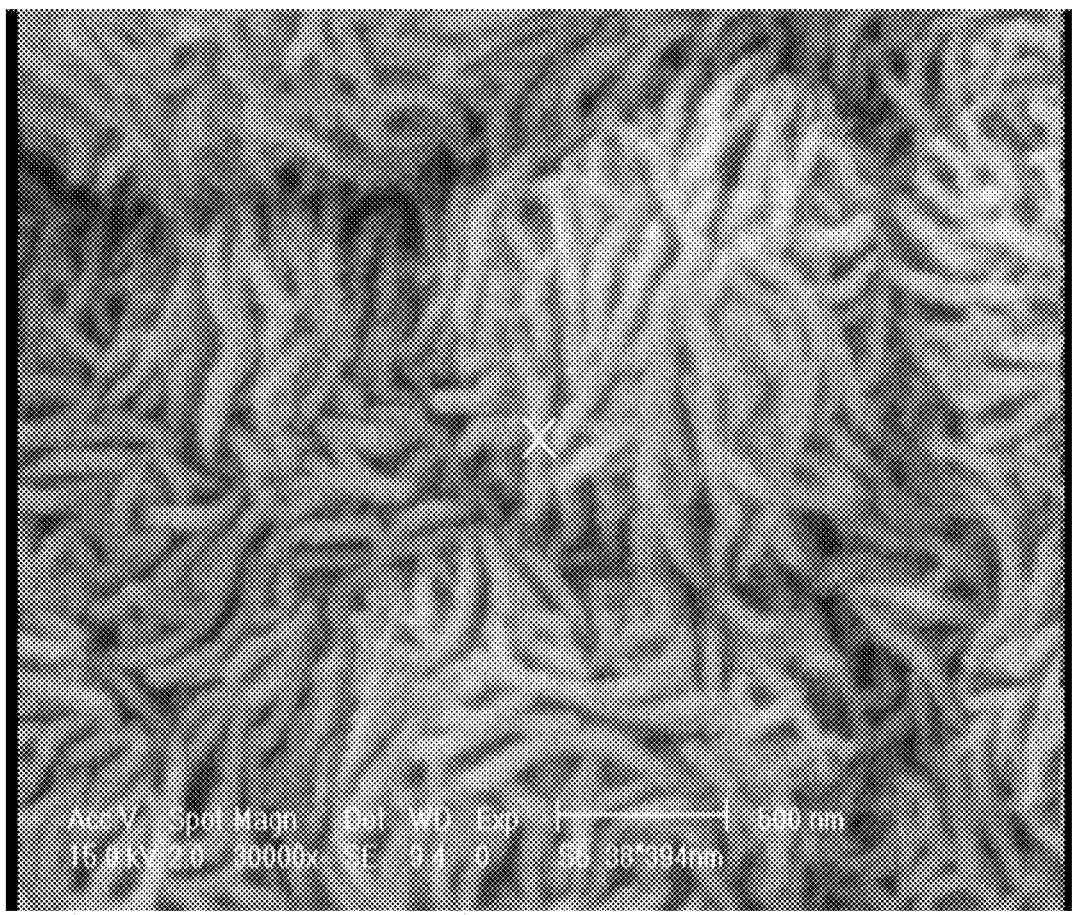
FIG. 4 is a scanning electron microscope (SEM) image of $MoS_2$ nanoparticles prepared by hydrothermal method, pursuant to the teachings of the present invention.

With reference now to FIG. 4 of the DRAWINGS, there is illustrated a scanning electron microscope (SEM) image of nano-$MoS_2$ particles prepared by the hydrothermal method described hereinabove, with an image resolution of 500 nm. This image illustrates the strain-like structure of said $MoS_2$ particles, as well as their nanometric size.

Example 3

In this example, nano-$MoS_2$ particles are exfoliated via a method described in more details hereinafter. Here, 7 grams of the nano-$MoS_2$ particles, prepared via either of the two methods described hereinabove, are exfoliated using 400 milliliters of a 1.6 molar solution of n-butyl Lithium in n-Hexane under nitrogen atmosphere for 3 hours. The product is then washed with water, 2-Propanol and decalin, consecutively. The solution is preferably sonicated in a sonication bath for 15 minutes at ambient temperature for each washing step. The resultant solution contains the exfoliated nanometal sulfide particles dispersed in decalin.

Example 4

In this example, a hydrocracking reaction is carried out at 350° C. using the exfoliated $MoS_2$ nanocatalyst, synthesized as described in the examples 1-3 hereinabove. Here, 200 ppm of the aforementioned exfoliated nanocatalyst, which contains 2% by weight of the active metal in decalin, is added to about 150 grams of a heavy crude oil with properties presented hereinbelow in TABLE 1. A steel autoclave is loaded with this mixture and is pressurized with $H_2$ gas, and then it is heated at a rate of 5° C./min up to the desired reaction temperature. The reaction pressure could be in the range of about 30 bars to about 80 bars, and the reaction time is about 0.5 to 2 hours. The resultant liquid product is called sample No. 1.

TABLE 1

Heavy crude oil properties

| Property | Amount |
| --- | --- |
| Specific gravity @ 15.6/15.6° C. | 0.9860 |
| API Gravity | 12.0 |
| Kinematic Viscosity @ 100° C. (cSt) | 96.05 |
| Sulfur content (wt %) | 4.80 |
| Carbon content (wt %) | 84.0 |
| Hydrogen content (wt %) | 10.5 |

Example 5

In this example, hydrocracking reaction is carried out at 370° C. using the exfoliated $MoS_2$ nanocatalyst. Here, 200 ppm of the aforementioned exfoliated nanocatalyst, which contains 2% by weight of the active metal in decalin, is added to about 200 grams of a heavy crude oil with properties presented hereinabove in TABLE 1. A steel autoclave is loaded with this mixture and is pressurized with $H_2$ gas, and then it is heated at a rate of 5° C./min up to the desired reaction temperature. The reaction pressure could be in the range of about 30 bars to about 80 bars, and the reaction time is about 0.5 to 2 hours. The resultant liquid product is called sample No. 2.

Example 6

In this example, a hydrocracking reaction is carried out at 297° C. using the exfoliated $MoS_2$ nanocatalyst, synthesized as described in example 3 hereinabove. In this example, 200 ppm of the aforementioned exfoliated nanocatalyst, which contains 2% by weight of the active metal in decalin, is added to about 200 grams of a heavy crude oil with properties presented hereinabove in TABLE 1. A steel autoclave is loaded with this mixture and is pressurized with $H_2$ gas, and then it is heated at a rate of 5° C./min up to the desired reaction temperature. The reaction pressure could be in the range of about 30 bars to about 80 bars, and the reaction time is about 0.5 to 2 hours. The resultant liquid product is called sample No. 3.

Example 7

In this example, the hydrocracking reaction is carried out at 350° C. using the exfoliated $MoS_2$ nanocatalyst, synthesized as described in the example 3 hereinabove. In this example, 400 ppm of the aforementioned exfoliated nanocatalyst, which contains 2% by weight of the active metal in decalin, is added to about 200 grams of a heavy crude oil with properties presented hereinabove in TABLE 1. A steel autoclave is loaded with this mixture and is pressurized with $H_2$ gas, and then it is heated at a rate of 5° C./min up to the desired reaction temperature. The reaction pressure could be in the range of about 30 bars to about 80 bars, and the reaction time is about 0.5 to 2 hours. The resultant liquid product is called sample No. 4.

Example 8

In this example, the hydrocracking reaction is carried out at 350° C. using the exfoliated $MoS_2$ nanocatalyst, synthesized as described in the example 3 hereinabove. In this embodiment example, 100 ppm of the aforementioned exfoliated nanocatalyst, which contains 2% by weight of the active metal in decalin, is added to about 200 grams of a heavy crude oil with properties presented hereinabove in TABLE 1. A steel autoclave is loaded with this mixture and is pressurized with $H_2$ gas, and then it is heated at a rate of 5° C./min up to the desired reaction temperature. The reaction pressure could be in the range of about 30 bars to about 80 bars, and the reaction time is about 0.5 to 2 hours. The resultant liquid product is called sample No. 5.

Heavy crude oil properties are compared with the various hydrocracking products obtained as described in examples 4-8 hereinabove, designated as samples No. 1-5, respectively. Based on the results presented in TABLES 2 and 3 hereinbelow, the exfoliated nanocatalyst exhibits remarkable performance in different operational conditions. With reference to the tables, sample No. 1 shows the lowest specific gravity and distillation range, and the highest API gravity.

TABLE (2)

Heavy crude oil properties in comparison with hydrocracking products obtained as described in examples 4-8

| Sample Properties | Heavy crude oil | Sample NO. 1 | Sample NO. 2 | Sample NO. 3 | Sample NO. 4 | Sample NO. 5 |
| --- | --- | --- | --- | --- | --- | --- |
| API Gravity | 12.0 | 28.0 | 21.3 | 17.5 | 11.2 | 16.3 |
| Specific gravity @15.6/15.6° C. | 0.9860 | 0.8870 | 0.9260 | 0.9495 | 0.9915 | 0.9575 |
| Kinematic Viscosity @ 40° C. (cSt) | — | 2.177 | 4.413 | 2.177 | 6.168 | 2.605 |
| Kinematic Viscosity @ 100° C. (cSt) | 96.05 | — | — | 18.49 | — | — |
| Sulphur content (wt %) | 4.80 | 2.84 | 4.62 | 4.62 | 3.39 | 3.41 |
| Carbon content (wt %) | 84.0 | 85.5 | 83.2 | 83.2 | 86.2 | 86.9 |
| Hydrogen content (wt %) | 10.5 | 10.8 | 10.5 | 10.5 | 8.4 | 8.4 |
| Nitrogen content (wt %) | 1.1 | 1.3 | 1.2 | 1.2 | 0.6 | 0.7 |

TABLE (3)

Heavy crude oil properties in comparison with hydrocracking products obtained as described in examples 4-8

| Distillation range 760 mmHg (vol %) ASTM D86° C. | Heavy crude oil | Sample NO. 1 | Sample NO. 2 | Sample NO. 3 | Sample NO. 4 |
|---|---|---|---|---|---|
| IBP | 262 | 84 | 55 | 211 | 22.2 |
| @ 5% | 290 | 98 | 101 | 265 | 110.0 |
| @ 10% | 312 | 105 | 114 | 303 | 143.0 |
| @ 15% | 355 | 111 | 117 | 346 | 165.0 |
| @ 20% | 387 | 115 | 129 | 395 | 180.0 |
| @ 30% | 410 | 121 | 147 | 445 | 190.0 |
| @ 40% | 455 | 130 | 156 | 505 | 196.0 |
| @ 50% | — | 148 | 159 | 533 | 205.0 |
| @ 60% | 495 | — | 211 | — | 223.0 |
| @ 70% | 517 | — | 271 | — | 290.0 |
| @ 80% | 533 | — | — | — | 358.0 |
| EP | 533 | — | — | 533 | 392.0 |

Comparative Example

It should be understood that the use of $MoS_2$ microparticles to synthesize exfoliated $MoS_2$ catalysts is known in the prior art. In this comparative example, however, the structure and the performance of the exfoliated $MoS_2$ nanocatalyst is compared with the structure and the performance of an exfoliated $MoS_2$ catalyst, synthesized using commercial $MoS_2$ microparticles (hereinafter "micro-$MoS_2$"). Both nano-$MoS_2$ particles and micro-$MoS_2$ particles are exfoliated via the method described in connection with Example 3 hereinabove. The resultant catalysts are then used in a heavy crude oil hydrocracking process. The experimental conditions under which the hydrocracking process is carried out in the present invention is compared to the hydrocracking conditions disclosed in the prior art, as set forth and shown in TABLE 4 presented hereinbelow.

Furthermore, the resultant products from the two hydrocracking processes are compared and the results are also set forth and shown in TABLE 5 presented hereinbelow.

TABLE 4

Experimental conditions of hydrocracking process in the presence of $MoS_2$ micro and nano particles

| Reaction Conditions | Exfoliated $MoS_2$ microparticles | Exfoliated $MoS_2$ nanoparticles |
|---|---|---|
| Reaction Temperature | 400-450° C. | 350° C. |
| Catalyst concentration | 600 ppm | 200 ppm |

TABLE 5

Product properties of hydrocracking process in the presence of $MoS_2$ micro and nano particles

| BOILING POINTS | Wt % of the product using Exfoliated $MoS_2$ microparticles | Wt % of the product using Exfoliated $MoS_2$ nanoparticles |
|---|---|---|
| LESS THAN 177° C. | 4.04 | 17 |
| 177-343° C. | 25.02 | 48 |
| 343-525° C. | 29.71 | 15 |
| MORE THAN 525° C. | 41.23 | 20 |

As can be seen in TABLE 4, the optimal catalyst dosage, as set forth in the prior art for exfoliated micro-$MoS_2$ catalyst, is 600 ppm, while the optimal catalyst dosage in the comparative example for a nanocatalyst synthesized according to the method described in the present invention is about 200 ppm. The results obtained and presented in TABLE 5 hereinabove show that the hydrocracking process carried out using the nanocatalyst disclosed in the present invention produces lighter liquids compared to the process disclosed in the prior art, even though using a significantly lower dosage of the nanocatalyst in the process.

Furthermore, the aforementioned reduction in the reaction temperature, as well as reduction in the overall amount of the catalyst dosage for the hydrocracking process, represent a significant economic advantage and makes the slurry hydrocracking process economically feasible, which is not feasible in the prior art.

For a more detailed comparison between the two catalysts described hereinabove, transmission electron microscope (TEM) images of the exfoliated nano-$MoS_2$ catalyst and the exfoliated micro-$MoS_2$ catalyst are presented in FIGS. 5 and 6 of the DRAWINGS, respectively, described hereinbelow.

Figure 5:
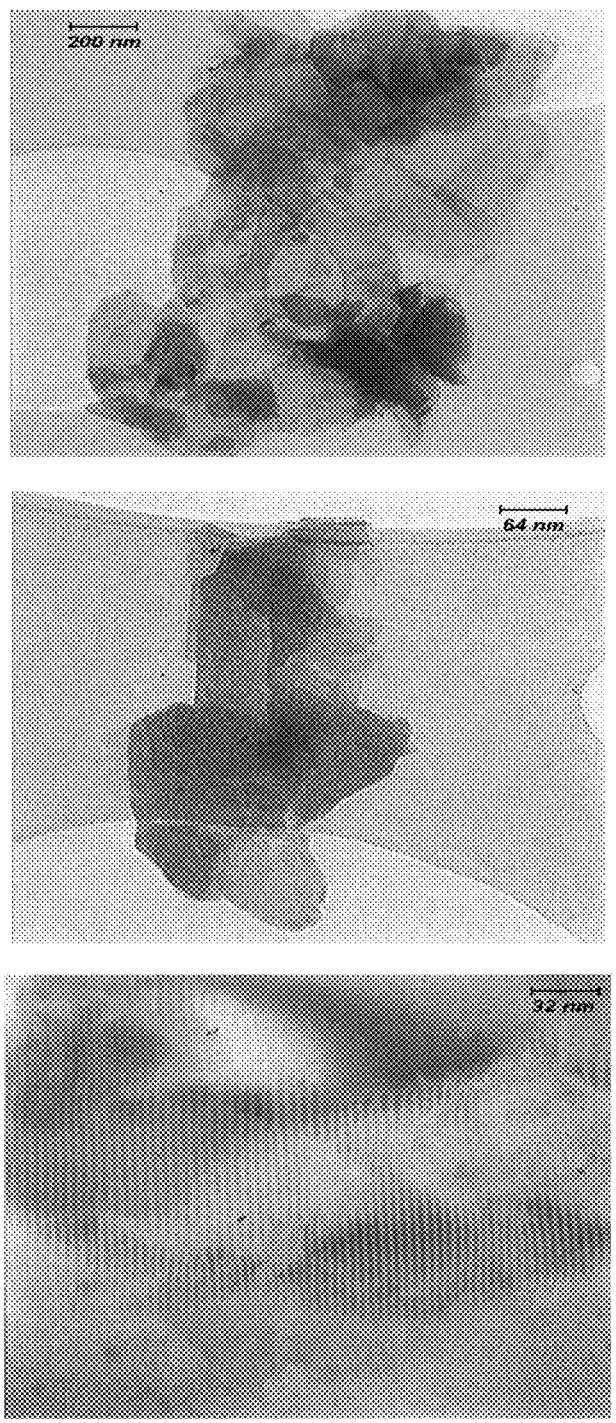
FIG. 5 is the transmission electron microscope (TEM) images of the exfoliated $MoS_2$ nanoparticles, with image resolutions of 200 nm, 64 nm, and 32 nm, respectively.

With reference now to FIG. 5 of the DRAWINGS, this figure illustrates transmission electron microscope (TEM) images of the aforesaid exfoliated nano-$MoS_2$ particles, with image resolutions of 200 nm, 64 nm, and 32 nm, respectively. As can be seen in these images, the exfoliated $MoS_2$ nanocatalysts, synthesized as disclosed via the techniques of the present invention, exhibit a regular formation with all the exfoliated planes formed parallel to each other, with the thickness of each exfoliated plane being about 3 nm.

Figure 6:
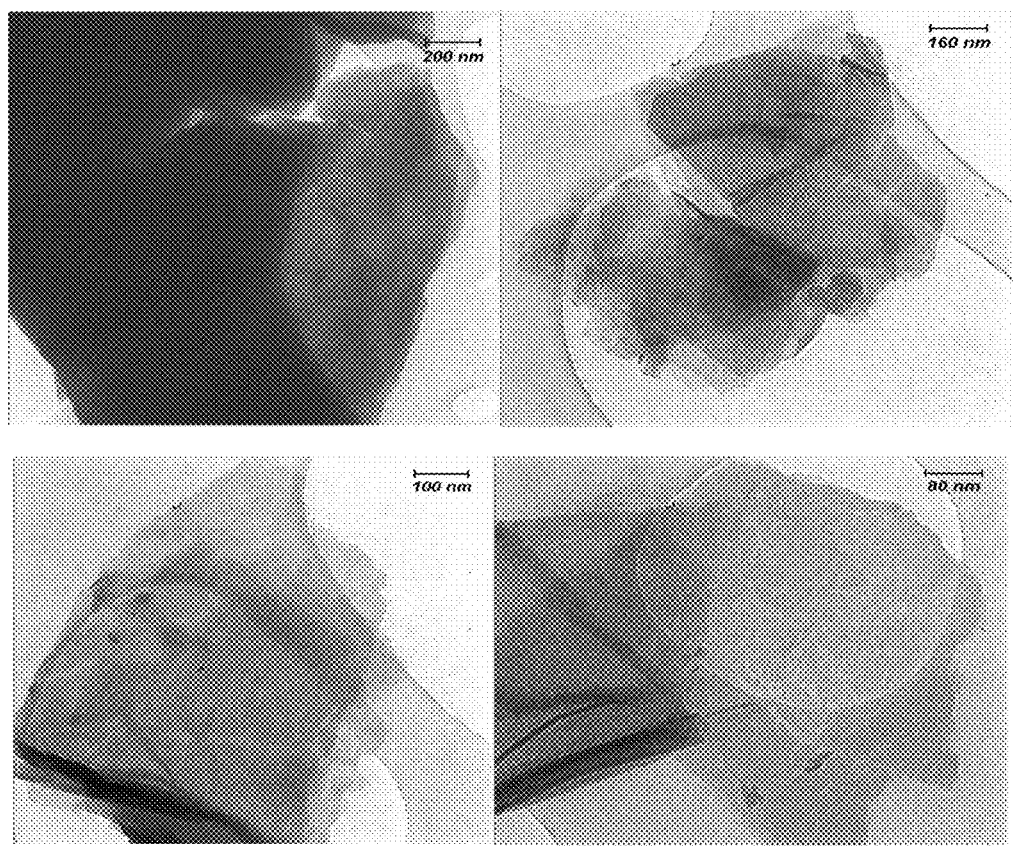
FIG. 6 is the transmission electron microscopy (TEM) images of the exfoliated commercial $MoS_2$ microparticles, with image resolutions of 200 nm (TOP LEFT), 160 nm (TOP RIGHT), 100 nm (BOTTOM LEFT), and 80 nm (BOTTOM RIGHT).

With reference now to FIG. 6 of the DRAWINGS, this figure illustrates transmission electron microscope (TEM) images of the exfoliated commercial micro-$MoS_2$ particles, with image resolutions of 200 nm, 160 nm, 100 nm, and 80 nm respectively. As can be seen in these images, the resultant catalyst does not have the regular formation exhibited by the nanocatalysts formulated pursuant to the teachings and principles of the present invention. Considering the effect of the formation of the exfoliated $MoS_2$ particles on the reactivity of the catalyst, the superior activity exhibited by the nanocatalysts of the instant invention can be explained.

Using transition metal nanocatalysts disclosed in the present invention not only reduces the hydrocracking process temperature and catalyst dosage, but also increases lighter liquid yields, as is amply demonstrated in the comparative results set forth in TABLES 4 and 5 hereinabove.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the breadth or scope of the applicant's concept. Furthermore, although the present invention has been described in connection with a number of exemplary embodiments and implementations, the present invention is not so limited but rather covers various modifications and equivalent arrangements, which fall within the purview of the appended claims.

What is claimed is:

1. A heavy crude oil nanocatalyst comprising:
exfoliated transition metal sulfide nanoparticles,
wherein said nanoparticles are dispersed in a nonpolar solvent.

2. The heavy crude oil nanocatalyst according to claim 1, wherein the transition metal is from the fifth or the sixth group of transition metals in the periodic table of the elements.

3. The heavy crude oil nanocatalyst according to claim 1, wherein said transition metal sulfide is selected from the group consisting of molybdenum disulfide, tungsten disulfide, chromium sulfide, and mixtures thereof.

4. The heavy crude oil nanocatalyst according to claim 1, wherein said nonpolar solvent is decalin.

5. The heavy crude oil nanocatalyst according to claim 1, wherein said transition metal sulfide is molybdenum disulfide.

6. The heavy crude oil nanocatalyst according to claim 1, wherein said transition metal sulfide is tungsten disulfide.

7. The heavy crude oil nanocatalyst according to claim 1, wherein said exfoliated transition metal sulfide comprises a weight percentage of the nanocatalyst ranging from about 0.5% to about 5%.

8. The heavy crude oil nanocatalyst according to claim 1, wherein said exfoliated transition metal sulfide nanoparticles have an average size of about 30 nm to about 90 nm.

9. The heavy crude oil nanocatalyst according to claim 1, wherein said nanocatalyst comprises a layered structure.

10. A method for synthesizing a heavy crude oil upgrading nanocatalyst, the method comprising:

synthesizing transition metal sulfide nanoparticles;
exfoliating the transition metal sulfide nanoparticles in a polar solvent; and
exchanging the polar solvent with a nonpolar solvent, such that the heavy crude oil upgrading nanocatalyst is formed.

11. The method according to claim 10, wherein the transition metal is from the fifth or the sixth group of transition metals in the periodic table.

12. The method according to claim 10, wherein said transition metal sulfide is selected from the group consisting of molybdenum disulfide, tungsten disulfide, chromium sulfide, and mixtures thereof.

13. The method according to claim 10, wherein said transition metal sulfide is molybdenum disulfide.

14. The method according to claim 10, wherein said transition metal sulfide is tungsten disulfide.

15. The method according to claim 10, wherein said polar solvent is water.

16. The method according to claim 10, wherein said nonpolar solvent is decalin.

17. The method according to claim 10, wherein said synthesizing is done using a technique selected from the group consisting of hydrothermal, sulfidation, sol-gel, spray pyrolysis, and combinations thereof.

* * * * *